(12) United States Patent
Luo et al.

(10) Patent No.: US 7,764,359 B2
(45) Date of Patent: Jul. 27, 2010

(54) SYSTEMS AND METHOD FOR DISTANCE MEASUREMENT

(75) Inventors: Yin-Long Luo, Hang-Zhou (CN); Song Li, Hang-Zhou (CN)

(73) Assignee: Asia Optical Co., Inc., Tepz, Taichung (TW)

( * ) Notice: Subject to any disclaimer, the term of this patent is extended or adjusted under 35 U.S.C. 154(b) by 294 days.

(21) Appl. No.: 11/939,586

(22) Filed: Nov. 14, 2007

(65) Prior Publication Data

US 2008/0117406 A1 May 22, 2008

(30) Foreign Application Priority Data

Nov. 22, 2006 (TW) .............................. 95143129 A

(51) Int. Cl.
*G01C 3/08* (2006.01)
(52) U.S. Cl. ...................................... 356/5.15; 356/5.1
(58) Field of Classification Search ................ 356/4.01, 356/5.01, 5.1, 5.15
See application file for complete search history.

(56) References Cited

U.S. PATENT DOCUMENTS

| | | | | |
|---|---|---|---|---|
| 5,082,364 A * | 1/1992 | Russell | ...................... | 356/5.15 |
| 6,115,114 A * | 9/2000 | Berg et al. | .................. | 356/5.13 |
| 6,633,367 B2 * | 10/2003 | Gogolla | ..................... | 356/5.15 |
| 6,852,966 B1 * | 2/2005 | Douma et al. | ......... | 250/214 AG |
| 7,453,554 B2 * | 11/2008 | Yang et al. | .................... | 356/5.1 |
| 2007/0127009 A1 * | 6/2007 | Chen et al. | .................... | 356/5.1 |
| 2008/0239281 A1 * | 10/2008 | Bridges | ..................... | 356/5.09 |

\* cited by examiner

*Primary Examiner*—Isam Alsomiri
(74) *Attorney, Agent, or Firm*—Thomas, Kayden, Horstemeyer & Risley

(57) ABSTRACT

Embodiments of a distance measurement system are provided, in which a light signal generator comprises a first emission unit outputting a light beam to a target according to a first frequency-modulation signal, and a light-mixing unit generating a light mixing signal according to a second frequency-modulated signal and a reflection light beam reflected from the target. An electrical mixing unit generates an electrical mixing signal according to the first and second frequency-modulation signals, and a processing unit performs a phase difference estimation to obtain an evaluated value between the target and the distance measurement system according to the light mixing signal and the electrical mixing signal, and obtains a corresponding distance compensation value to compensate for the distance evaluated value according to an amplitude of the reflection light beam.

20 Claims, 6 Drawing Sheets

| | D1 | D2 | ········ | D16 |
|---|---|---|---|---|
| | 0.5m | 1.0m | ········ | 8.0m |
| 1 | D1CV1 | D2CV1 | ········ | D16CV1 |
| 2 | D1CV2 | D2CV2 | ········ | D16CV2 |
| 3 | D1CV3 | D2CV3 | ········ | D16CV3 |
| 4 | D1CV4 | D2CV4 | ········ | D16CV4 |
| 5 | D1CV5 | D2CV5 | ········ | D16CV5 |
| ⋮ | ⋮ | ⋮ | ⋮ | ⋮ |
| 15 | D1CV15 | D2CV15 | ⋮ | D16CV15 |
| 16 | D1CV16 | D2CV16 | ⋮ | D16CV16 |

LUT

FIG. 5

SYSTEMS AND METHOD FOR DISTANCE MEASUREMENT

BACKGROUND OF THE INVENTION

1. Field of the Invention

The invention relates to distance measurement, and in particular to a laser distance measurement system and distance measurement method thereof.

2. Description of the Related Art

With advancements in electronic technology and semiconductor lasers, handheld range finders are widely applied in fields related to buildings, traffic, topographic surveys, interior decoration, and the like. Generally, the range finders are equipped with an emitter to emit a light beam (laser beam), in which the laser beam is a visible light beam facilitated to align with a tested point (i.e., target). A receiver built into the range finders receives the reflected light beam and compares the phase difference between the light beam from the emitter and the received light beam to calculate the distance between the target and the range finder.

BRIEF SUMMARY OF THE INVENTION

Embodiments of a distance measurement system are provided, in which a light signal generator comprises a first emission unit outputs a light beam to a target according to a first frequency-modulation signal, and a light mixing unit generates a light mixing signal according to a second frequency-modulated signal and a reflection light beam reflected from the target. An electrical mixing unit generates an electrical mixing signal according to the first and second frequency-modulation signals, and a processing unit performs a phase difference estimate to obtain a distance estimate between the target and the distance measurement system according to the light mixing signal and the electrical mixing signal, and obtains a corresponding distance compensation value to compensate for the distance estimate according to an amplitude of the reflection light beam.

The invention provides another embodiment of a distance measurement system, in which a frequency synthesizer generates first and second frequency-modulation signals, and a first light signal generator comprises a first emission unit to emit a first light beam according to the first frequency-modulation signal. An optical converter generates a light-mixing signal according to a second frequency-modulation signal and a reflection light beam reflected from the target, and a mixer generates an electrical mixing signal according to the first and second frequency-modulation signals. A lookup table stores the relationship between distance compensation values and amplitude saturation of the reflection light beam reflected from the target, and a processing unit calculates a distance evaluated value between the target and the distance measurement system according to the light mixing signal and the electrical mixing signal and obtains a corresponding distance compensation value to compensate for the distance evaluated value according to an amplitude of the reflection light beam and the lookup table.

The invention provides an embodiment of a distance measurement method, in which a light beam is emitted to a target, a light mixing signal is generated according to a reflection light beam reflected from the target, a distance evaluated value between the target and the distance measurement system is calculated according to the light mixing signal and an electrical mixing signal. A distance compensation value is obtained according to amplitude of the reflection light beam, and the distance evaluated value is compensated according to the distance compensation value so as to obtain the distance between the target and the distance measurement system.

BRIEF DESCRIPTION OF THE DRAWINGS

The invention can be more fully understood by reading the subsequent detailed description and examples with references made to the accompanying drawings, wherein:

FIG. 5 shows a lookup table illustrating the relationship between offsets of distance evaluated values and signal saturation with different fixed distances;

DETAILED DESCRIPTION OF THE INVENTION

Figure 1:
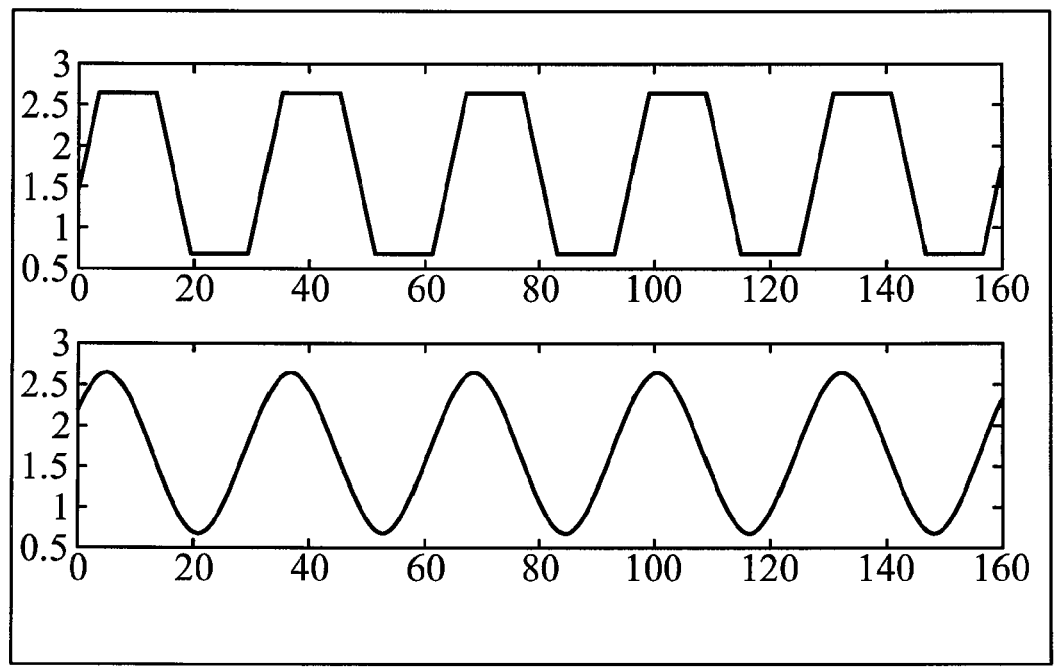
FIG. 1 shows the amplitudes of a reflected signal when the target is a black object and a white object respectively in which APD is operating at a fixed bias voltage.

The following description is of the best-contemplated mode of carrying out the invention. This description is made for the purpose of illustrating the general principles of the invention and should not be taken in a limiting sense. The scope of the invention is best determined by reference to the appended claims.

Generally, laser distance measurement systems use P-I-N photodiodes or avalanche photodiodes (APDs) to convert light beams reflected from a target into electrical signals. For example, a light current detected by the APD can be represented as.

$$I_P = \frac{e\eta P}{hv} M \qquad (1)$$

Wherein P represents incident light intensity, $\eta$ represents quantum conversion efficiency, e represents electron charge, hv represents photoelectron energy, M represents amplification ratio of the APD, and the relationship between the amplification ratio M and a reverse bias voltage across the APD can be expressed as $$M = \frac{1}{\left[1-\left(\frac{V}{V_B}\right)^N\right]} \qquad (2)$$

Hence, the equation (1) can be expanded as $$I_P = AP\left[a_0 + a_1 \frac{V_a}{V_B} + a_2\left(\frac{V_a}{V_B}\right)^2 + a_3\left(\frac{V_a}{V_B}\right)^3 + ...\right] \qquad (3)$$

In equation (3), $V_B$ represents a reverse breakdown voltage, $$A = \frac{e\eta P}{h\nu}$$

represents a constant, $a_0$, $a_1$ and $a_2$ can be expansion coefficients, $V_d$ represents the DC reverse bias voltage and $V_a$ represents an amplitude of a local oscillation signal.

It is assumed that $$P = P_0(1 + m \cos \omega_1 t) \quad (4)$$

$$V_a = V_m \cos \omega_2 t \quad (5)$$

According to equations (4) and (5), the equation (3) can be written as $$I_P = \frac{1}{2} A P_0 m \left(\frac{V_m}{V_B}\right) \cos[(\omega_1 - \omega_2)t] \times \left(a_1 + \frac{3}{4} a_3 \times \left(\frac{V_m}{V_B}\right)^2 + \ldots\right) \quad (6)$$

By first approximation, the equation (6) can be written as $$I_P = \frac{a_1}{2} A P_0 m \left(\frac{V_m}{V_B}\right) \cos[(\omega_1 - \omega_2)t] \quad (7)$$

In view of the above, photoelectric current $I_P$ output from the APD, incident intensity $P_0$ and modulation coefficient m of the incident light have a proportional relationship, along with amplitude of a local oscillation signal. Further, when the APD serves as the mixer, the relationship between the reverse bias voltage and the amplitude of a frequency difference signal becomes very complex and can be affected by lots of factors. Hence, it is very complex to adjust the amplitude of a frequency difference signal by adjusting the DC bias voltage directly. Further, changing DC bias voltage also affect operation state of the APD, such that phase of the output signal drifts and the measurement time increases. Thus, it is not suitable for high speed measurement applications.

FIG. 1 shows the amplitudes of a reflected signal when the target is a black object and a white object respectively, in which APD is operating at a fixed bias voltage. As shown, the reflection signal is not saturated when a tested target is a black object with least reflectivity, but the reflection signal is saturated when a tested target is a white object with high reflectivity. Following application, it is normally discovered that the amplitude of frequency difference signal generated by the APD has different saturations when the reflectivity of the target changes under a fixed distance.

Hence, saturation of the amplitude of frequency difference signal generated by the APD changes as the reflectivity of the tested target changes under a fixed distance. Further, the detected phase difference changes as the reflectivity of the target changes. Namely, the calculated distance value has different offsets according to the reflectivity of the target. Thus, the invention uses a lookup table recording a relationship between the amplitude (i.e. saturations) of frequency difference signal generated by the APD and the phase offsets to compensate for the calculated distance quickly, thereby increasing measurement speed and accuracy of the distance measurement system.

In one embodiment, it is assumed that the reflection signal is saturated when the amplitude of the reflection signal exceeds a predetermined value, and the distance measurement system calculates phase difference and saturation points per period at the same time. For example, when the reflection signal has 32 sample points per period, saturation thereof can be divided into 16 stages. Using a target with gradual changing reflectivity, distance offset corresponding to each stage of saturation can be detected, and thus, a relationship between saturation and distance offset can be obtained to compensate detected distance by lookup table.

Figure 2:
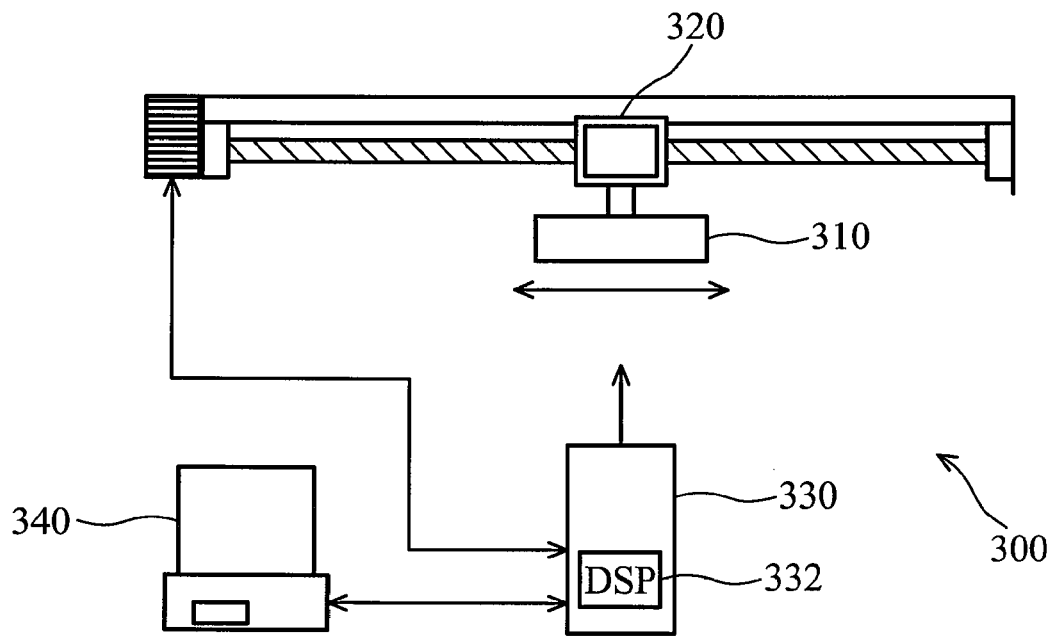
FIG. 2 shows an embodiment of a test platform of the invention.

FIG. 2 shows an embodiment of a test platform according to the invention. As shown, a test platform 300 comprises a target board 310 with gradual change gray levels, a movable platform 320, a range finder 330 and a computer device 340. The target board 310 with gradual changing gray levels is disposed on the platform 320, and the range finder 330 is disposed vertical to the target board 310. Under a fixed distance, the digital signal processor 332 outputs calculated distance values to the computer device 340 by changing the gray level (reflectivity) of target board 310, and then the target board 310 is moved to a next distance for another distance calculation until the target board 310 is moved out of the measurable scope. Because of the change in gray levels (i.e. reflectivity) of target board 310, the amplitude of the reflection signal reflected from the target board 310 changes accordingly, and thus, the relationship between offsets of the distance evaluated value and signal saturation can be obtained.

Figure 3:
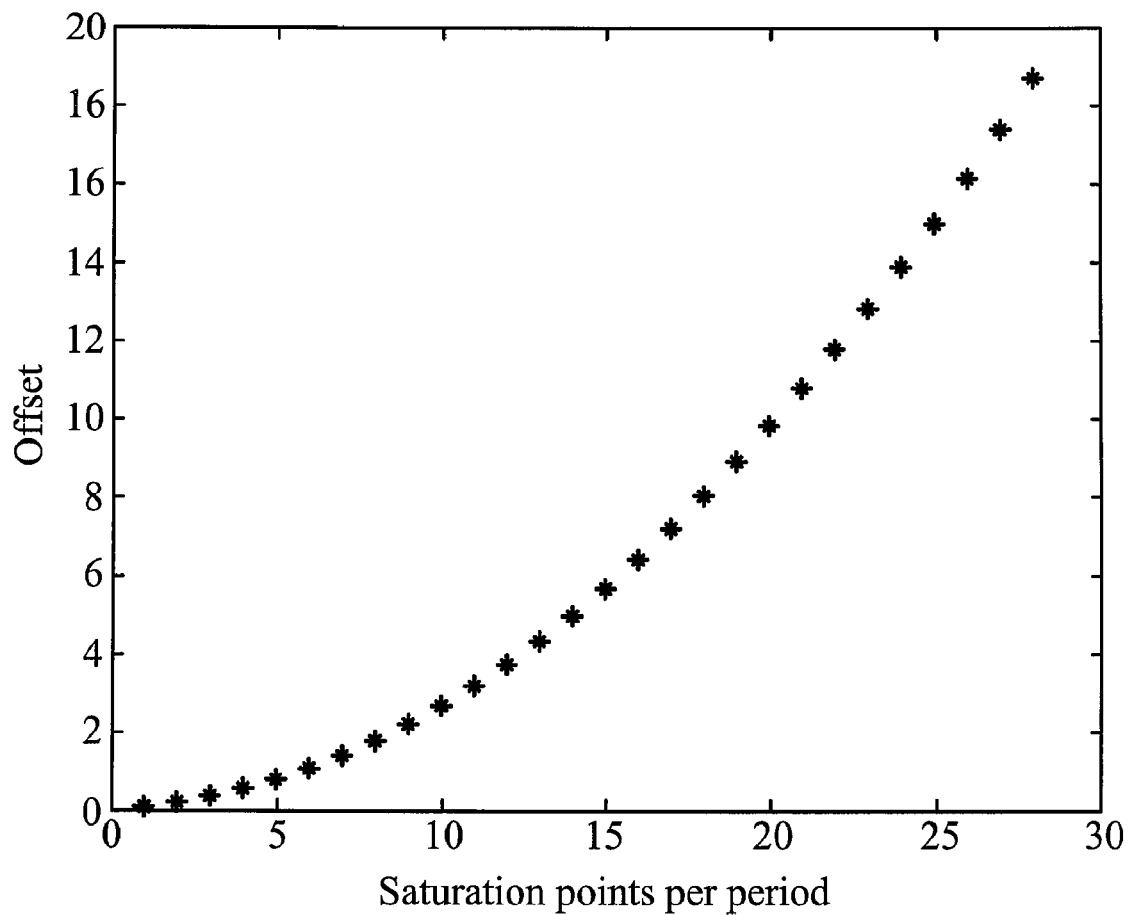
FIG. 3 shows the relationship between offsets of a distance evaluated value and signal saturation when the fixed distance is 1.5 meters.
Figure 4:
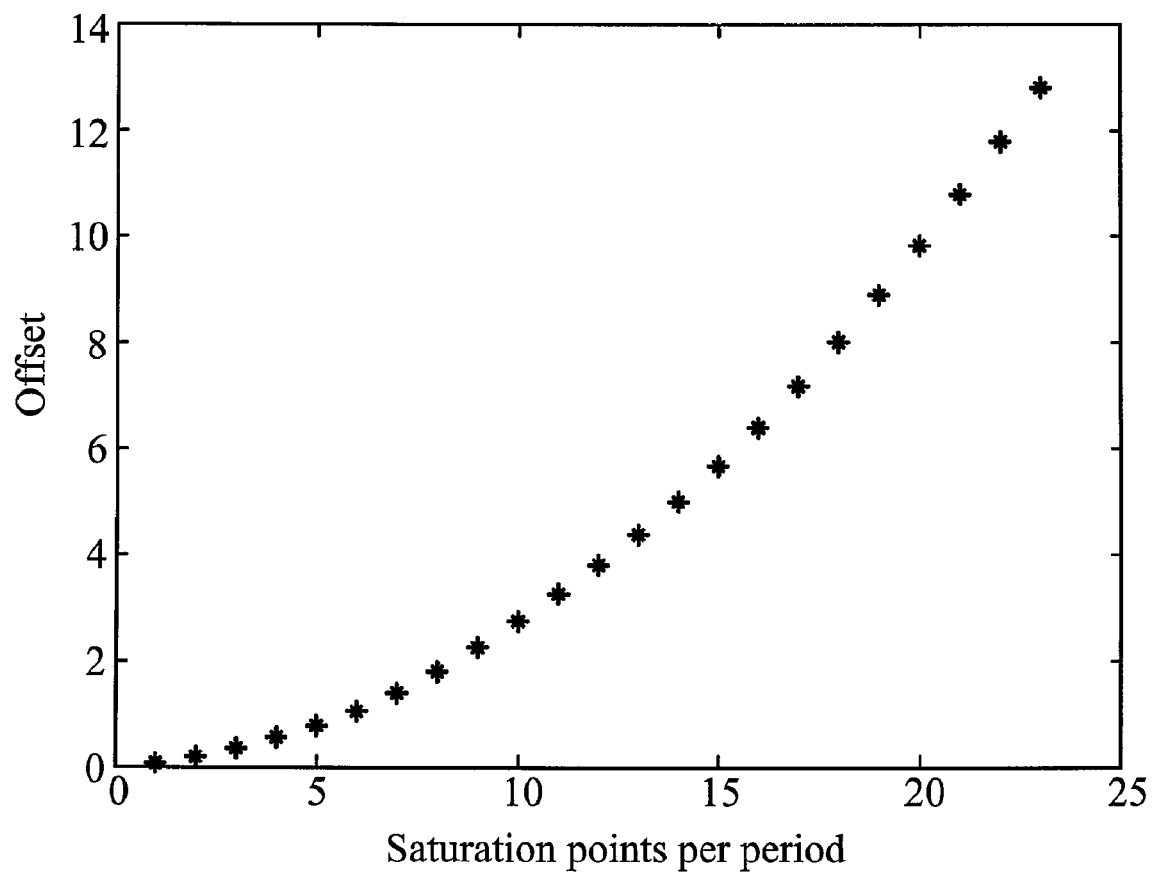
FIG. 4 shows the relationship between offsets of a distance evaluated value and signal saturation when the fixed distance is 1.7 meters.

FIG. 3 shows the relationship between offsets of a distance evaluated value and signal saturation (saturation points per period) when the fixed distance is 1.5 meters, and FIG. 4 shows the relationship between offsets of a distance evaluated value and signal saturation when the fixed distance is 1.7 meters. Comparing FIGS. 3 and 4, it is revealed that the further the distance is between the target and the range finder 330, the weaker the intensity is of the reflected signal and the lesser the saturation points are.

Thus, a lookup table LUT (as shown in FIG. 5) can be obtained by the relationship between the offsets of the distance evaluated values and signal saturation with different fixed distances. As shown in FIG. 5, the first column shows the distance compensation values D1CV1~D1CV16 according to different saturation when the fixed distance is 0.5 meters. The second column shows the distance compensation values D2CV1~D2CV16 according to different saturation when the fixed distance is 1.0 meters, and so on. The last column shows the distance compensation values D16CV1~D16CV16 according to different saturation when the fixed distance is 8.0 meters. For example, the lookup table can also comprise more then 16 columns.

Figure 6:
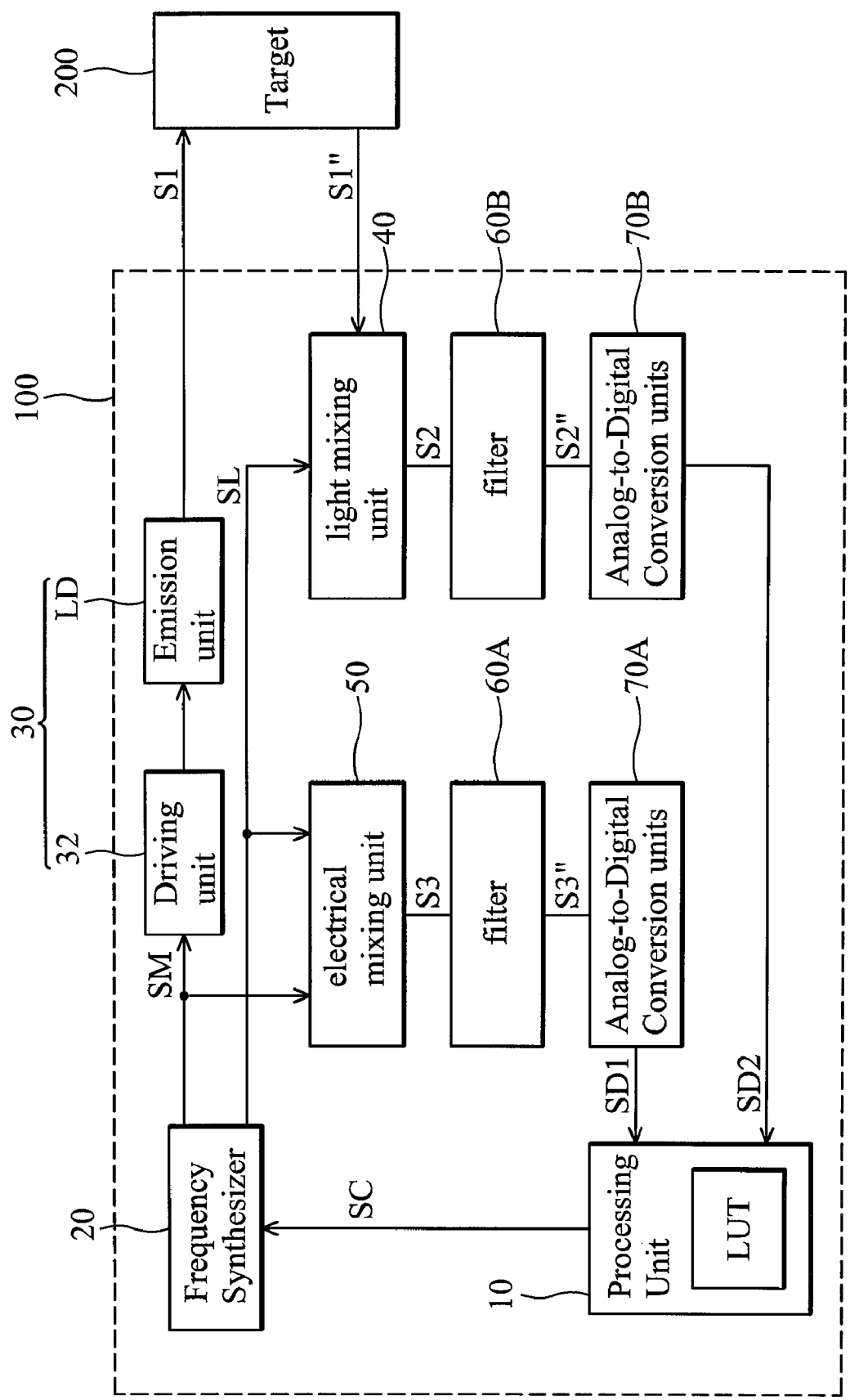
FIG. 6 shows a diagram of a distance measurement system according to the invention.

FIG. 6 shows a diagram of a distance measurement system according to the invention. As shown, the distance measurement system 100 comprises a processing unit 10, a frequency synthesizer 20, a light signal generator 30, a light mixing unit 40, an electrical mixing unit 50, filters 60A and 60B and analog-to-digital conversion units 70A and 70B.

The frequency synthesizer 20 is coupled to the processing unit 10 and the light signal generator 30 to generate first and second frequency-modulated signals SM and SL. For example, the first and second frequency-modulated signals SM and SL have a frequency difference with several KHz.

The light signal generator 30 emits a light beam S1 to the target 200 according to the first frequency-modulated signal SM, and the reflection light beam S1" reflected from the target 200 is inputted to the light mixing unit 40. In this embodiment, the light signal generator 30 comprises a driving unit 32 and an emission unit LD, and the emission unit LD can, for example, be a laser diode.

The light mixing unit 40 receives the reflection light beam S1" and the first frequency-modulated signal SM to generate a light mixing signal S2. For example, the light-mixing unit 40 can be an avalanche photodiode (APD), but is not limited thereto.

The electrical mixing unit 50 generates an electrical mixing signal S3 according to the first and second frequency-modulated signals SM and SL. For example, the electrical mixing unit 50 can be a mixer.

The filter 60A is coupled to the electrical mixing unit 50 to receive the electrical mixing signal S3 and output a low frequency signal S3", and the filter 60B is coupled to the light mixing unit 40 to receive the light mixing signal S2 and output a low frequency signal S2". For example, the filters 60A and 60B are band-pass filters to filter out the low frequency signals S2" and S3" with phase information.

The analog-to-digital conversion units 70A and 70B are coupled to the filters 60A and 60B respectively, to receive the low frequency signal S3" and S2" and output digital signals SD1 and SD2, such that the processing unit 10 obtains the distance between the target and the distance measurement system 100. For example, the analog-to-digital conversion units can be analog-to-digital converters (ADCs).

Namely, the first frequency-modulated signal SM and the reflection light beam S1" reflected from the target 200 is mixed by the light mixing unit 40 to generate the light mixing signal S2 and the light mixing signal S2 is then filtered by the filter 60B to obtain the digital signal SD2 (i.e., a measurement signal). The first and second frequency-modulated signals SM and SL is mixed by the electrical mixing unit 50 to generate the electrical mixing signal S3 and the electrical mixing signal S3 is then filtered by the filter 60A to obtain the digital signal SD2 (i.e., a reference signal).

The processing unit 10 performs a distance calculation to calculate a distance evaluated value between the target 200 and the distance measurement system 100 according to the digital signals SD1 and SD2. For example, the processing unit 10 can be a digital signal processor (DSP) to receive the digital signals SD1 and SD2 from the ADCs 70A and 70B and perform a phase difference calculation to obtain a distance evaluated value between the distance measurement system 100 and the target 200.

In addition, the processing unit 10 obtains a distance compensation value according to the lookup table LUT shown in FIG. 5 and the amplitude of the reflection light beam S1" to compensate for the distance evaluated value. For example, the lookup table LHT can be stored in the processing unit 10 or a memory outside the processing unit 10.

The processing unit 10 obtains a distance compensation value according to the lookup table LUT and the amplitude saturation of the reflection light beam S1". For example, when the obtained distance evaluated value is less than 0.5 meters (in zoom D1), the processing unit 10 obtains a corresponding value in the distance compensation values D1CV1~D1CV16 in the first column according to the amplitude saturation (i.e. saturation points) of the reflection light beam S1". When the obtained distance evaluated value falls within the zoom D2 (i.e., 0.5~1.0 meter), the processing unit 10 obtains a corresponding distance compensation value in the distance compensation values D2CV1~D2CV16 in the second column according to the amplitude saturation (i.e. saturation points) of the reflection light beam S1", and so on. When the obtained distance evaluated value falls within the zoom D16 (i.e., 7.5~8.0 meter), the processing unit 10 obtains a corresponding distance compensation value in the distance compensation values D16CV1~D16CV16 in the last column according to the amplitude saturation (i.e. saturation points) of the reflection light beam S1". The processing unit 10 compensates (increases or decreases) the obtained distance evaluated value according to the obtained distance compensation value, thereby obtaining the distance between the target 200 and the distance measurement system 100.

Figure 7:
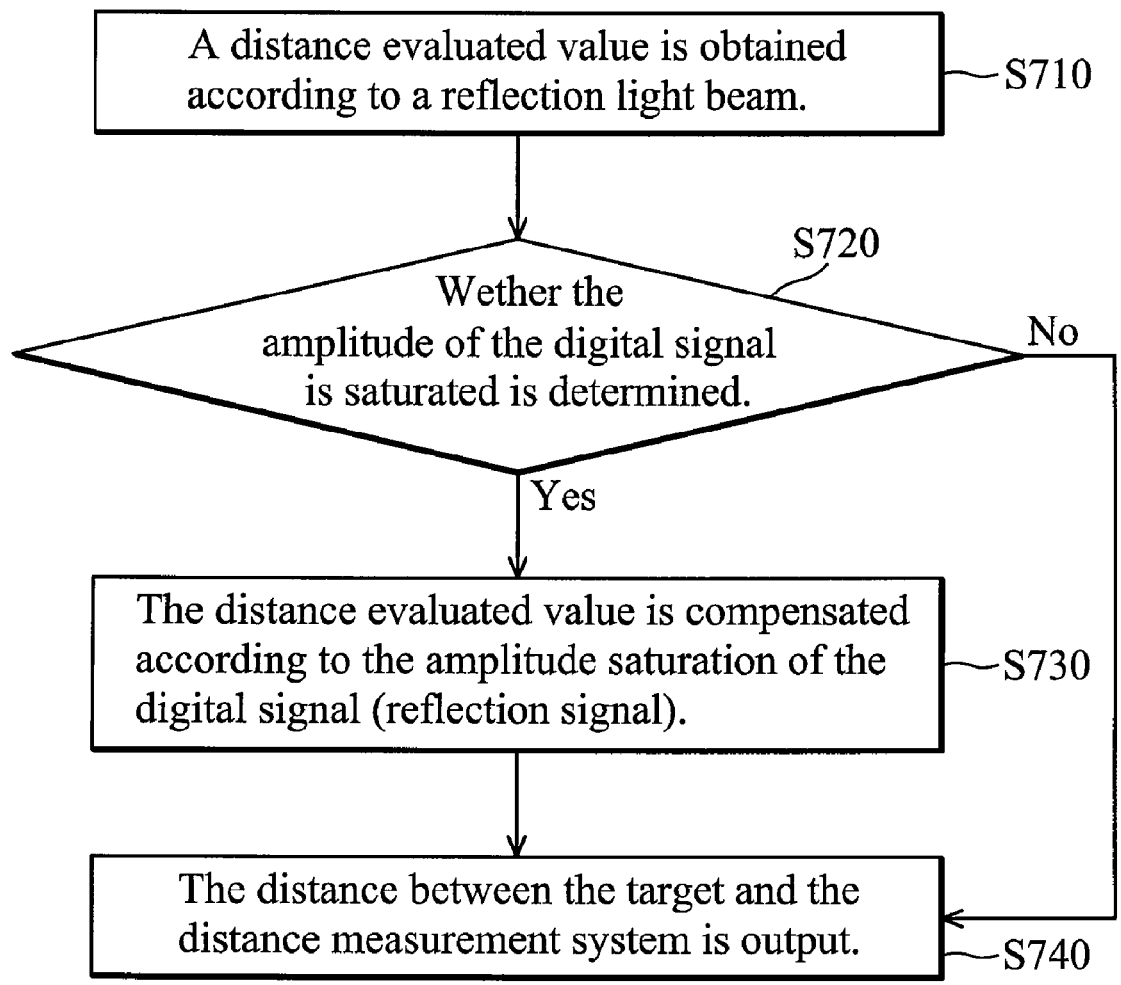
FIG. 7 is a flowchart diagram of a distance measurement method according to the invention.

FIG. 7 is a flowchart diagram of a distance measurement method according to the invention. The distance measurement method is discussed hereafter with reference to FIGS. 6 and 7.

In step S710, a distance evaluated value is obtained according to a reflection light beam. For example, the light signal generator 30 outputs a light beam S1 to the target 200 according to the first frequency-modulated signal SM, and the reflection signal S1" reflected from the target 200 is inputted to the light mixing unit 40. The light mixing unit 40 receives the reflection signal S1", and converts the reflection signal S1" to an electrical signal, and then the electrical signal is mixed with the second frequency-modulated signal SL to generate the light mixing signal S2. The light mixing signal S2 is filtered by the filter 60B to obtain the low frequency signal S2" and is sampled by the ADC 70B to obtain the digital signal SD2 with an amplitude.

In addition, the electrical mixing unit 50 generates the electrical mixing signal S3 according to the first and second frequency-modulated signals SM and SL, and then the electrical mixing signal S3 is filtered by the filter 60A to obtain the low frequency signal S3" and is sampled by the ADC 70A to obtain the digital signal SD1 with an amplitude. The processing unit 10 obtains the distance evaluated value according to the phase difference between the digital signals SD1 and SD2.

In step S720, it is determined whether the amplitude of the digital signal SD1 is saturated. In this embodiment, the digital signal SD1 is saturated when the signal amplitude exceeds a predetermined value. For example, if the amplitude of the digital signal SD1 is not saturated, step S740 is executed where the obtained distance evaluated value serving as the distance between the target 200 and the distance measurement system 100 is outputted. If the amplitude of the digital signal SD1 is saturated, step S730 is executed.

In step S730, the processing unit 10 obtains a distance compensation value according to the amplitude saturation of the digital signal SD1 to compensate for the distance evaluated value. In this embodiment, the reflection signal S1" has 32 sample points per period, and saturation thereof can be divided into 16 stages. The processing unit 10 calculates saturation points of the reflection signal S1" (i.e., the sample points exceeding the predetermined value), and obtains a corresponding distance compensation value by the lookup table accordingly.

For example, when the obtained distance evaluated value in the step S710 is less than 0.5 meters (in zoom D1), the processing unit 10 obtains a corresponding distance compensation value in the distance compensation values D1CV1~D1CV16 in the first column according to the amplitude saturation (i.e. saturation points) of the reflection light beam S1". When the obtained distance evaluated value in the step S710 falls within the zoom D2 (i.e., 0.5~1.0 meter), the processing unit 10 obtains a corresponding distance compensation value in the distance compensation values D2CV1~D2CV16 in the second column according to the amplitude saturation (i.e. saturation points) of the reflection light beam S1", and so on. When the obtained distance evaluated value in the step S710 falls within the zoom D16 (i.e., 7.5~8.0 meter), the processing unit 10 obtains a corresponding distance compensation value in the distance compensation values D16CV1~D16CV16 in the last column according to the amplitude saturation (i.e. saturation points) of the reflection light beam S1".

Then, in step S740, the processing unit 10 compensates for (i.e. increases or decreases) the obtained distance evaluated value according to the obtained distance compensation value, thereby obtaining the distance between the target 200 and the distance measurement system 100.

Namely, the embodiments of the invention can generate a light mixing signal according to the reflection light beam from the target, and generate a distance evaluated value according to light and electrical mixing signals, while also obtaining a distance compensation value to compensate for the obtained distance evaluated value according to amplitude saturation of the reflection light beam. Thus, a fast and highly accurate distance measurement can be obtained.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A distance measurement system, comprising:
   a light signal generator comprising an emission unit emitting a light beam to a target according to a first frequency-modulation signal;
   a light-mixing unit generating a light-mixing signal according to a second frequency-modulated signal and a reflection light beam reflected from the target;
   an electrical mixing unit generating an electrical mixing signal according to the first and second frequency-modulation signals; and
   a processing unit calculating a distance evaluated value between the target and the distance measurement system according to the light-mixing signal and the electrical mixing signal, and obtaining a corresponding distance compensation value to compensate for the distance evaluated value according to amplitude of the reflection light beam.

2. The distance measurement system as claimed in claim 1, further comprising a lookup table storing the relationship between distance compensation values and amplitude saturation.

3. The distance measurement system as claimed in claim 2, wherein the processing unit obtains the corresponding distance compensation value according to the lookup table and saturation of the amplitude of the reflection light beam.

4. The distance measurement system as claimed in claim 1, wherein the light signal generator further comprises a driving unit driving the emission unit to emit the light beam according the first frequency-modulation signal.

5. The distance measurement system as claimed in claim 1, further comprising a frequency synthesizer generating the first and second frequency-modulation signals.

6. The distance measurement system as claimed in claim 1, further comprising:
   a first filter receiving the light mixing frequency signal and outputting a first low frequency signal;
   a second filter receiving the electrical mixing signal and outputting a second low frequency signal; and
   first and second analog-to-digital converters receiving the first and second low frequency signals and outputting first and second digital signals for obtaining the distance evaluated value between the target and the distance measurement system.

7. The distance measurement system as claimed in claim 6, wherein the processing unit comprises a digital signal processor.

8. The distance measurement system as claimed in claim 6, wherein the first and second filters comprise band-pass filters.

9. The distance measurement system as claimed in claim 1, wherein the electrical mixing unit is a mixer.

10. The distance measurement system as claimed in claim 1, wherein the emission unit comprises a laser diode.

11. The distance measurement system as claimed in claim 1, wherein the light-mixing unit comprises an avalanche photodiode.

12. A distance measurement system, comprises:
    a frequency synthesizer generating first and second frequency-modulation signals;
    a light signal generator comprising an emission unit to emit a light beam according to the first frequency-modulation signal;
    an optical converter generating a light-mixing signal according to a second frequency-modulation signal and a reflection light beam reflected from the target;
    a mixer generating an electrical mixing signal according to the first and second frequency-modulation signals;
    a lookup table storing the relationship between distance compensation values and amplitude saturation of the reflection light beam reflected from the target; and
    a processing unit calculating a distance evaluated value between the target and the distance measurement system according to the light-mixing signal and the electrical mixing signal, and obtaining a corresponding distance compensation value to compensate for the distance evaluated value according to an amplitude of the reflection light beam and the lookup table.

13. The distance measurement system as claimed in claim 12, further comprising:
    a first filter receiving the light mixing frequency signal and outputting a first low frequency signal;
    a second filter receiving the electrical mixing signal and outputting a second low frequency signal; and
    first and second analog-to-digital converters receiving the first and second low frequency signals and outputting first and second digital signals for obtaining the distance evaluated value between the target and the distance measurement system.

14. The distance measurement system as claimed in claim 13, wherein the first and second low frequency filters comprise a band-pass filter each.

15. The distance measurement system as claimed in claim 13, wherein the emission unit comprises a laser diode.

16. The distance measurement system as claimed in claim 13, wherein the optical converter comprises an avalanche photodiode.

17. The distance measurement system as claimed in claim 13, wherein the processing unit comprises a digital signal processor.

18. A distance measurement method, comprising:
    emitting a light beam to a target;
    generating a light-mixing signal according to a reflection light beam reflected from the target;
    calculating a distance evaluated value between the target and the distance measurement system according to the light-mixing signal and an electrical mixing signal;
    obtaining a distance compensation value according to an amplitude of the reflection light beam; and compensating the distance evaluated value to obtain the distance between the target and the distance measurement system according to the distance compensation value.

19. The method as claimed in claim 18, wherein the distance compensation value is obtained according to the lookup table and saturation of the amplitude of the reflection light beam.

20. The method as claimed in claim 19, wherein the light beam outputted to the target is generated according to the first frequent-modulation signal emitted by an emission unit, and the electrical mixing signal is generated according to the first frequency-modulation signal and a second frequency-modulation signal.

* * * * *